US009158585B2

(12) United States Patent
Aharoni et al.

(10) Patent No.: US 9,158,585 B2
(45) Date of Patent: Oct. 13, 2015

(54) METHOD AND APPARATUS FOR WORKFLOW VALIDATION AND EXECUTION

(71) Applicant: International Business Machines Corporation, Armonk, NY (US)

(72) Inventors: Ehud Aharoni, Kfar Saba (IL); Ya'ara Goldschmidt, Kiryat Ono (IL); Tamar Lavee, Tel Aviv (IL); Hani Neuvirth-Telem, Tel Aviv (IL)

(73) Assignee: International Business Machines Corportion, Armonk, NY (US)

( * ) Notice: Subject to any disclaimer, the term of this patent is extended or adjusted under 35 U.S.C. 154(b) by 15 days.

(21) Appl. No.: 14/093,092

(22) Filed: Nov. 29, 2013

(65) Prior Publication Data

US 2014/0089927 A1    Mar. 27, 2014

Related U.S. Application Data

(62) Division of application No. 13/038,403, filed on Mar. 2, 2011, now Pat. No. 8,601,481.

(51) Int. Cl.
*G06F 9/46* (2006.01)
*G06F 3/00* (2006.01)
*G06F 9/50* (2006.01)
*G06F 3/06* (2006.01)

(52) U.S. Cl.
CPC .............. *G06F 9/50* (2013.01); *G06F 3/0611* (2013.01)

(58) Field of Classification Search
CPC .................. G06F 9/50; G06F 3/0611
See application file for complete search history.

(56) References Cited

U.S. PATENT DOCUMENTS

| 6,078,982 A | 6/2000 | Du et al. |
| 6,594,773 B1 | 7/2003 | Lisitsa et al. |
| 6,957,266 B2 | 10/2005 | Evans |

(Continued)

OTHER PUBLICATIONS

Nesime Tatbul et al., "Load Management and High Availability in the Borealis Distributed Stream Processing Engine", Geosensor Networks. Lecture Notes in Computer Science, 2008, vol. 4540/2008, 66-85, DOI: 10.1007/978-3-540-79996-2_5. Publisher: Springer-Verlag Berlin.

(Continued)

*Primary Examiner* — Camquy Truong
(74) *Attorney, Agent, or Firm* — Ziv Glazberg, Esq.

(57) ABSTRACT

A computer program product comprising: a non-transitory computer readable medium; and a description of a first block comprising: a definition of one or more output port groups each comprising one or more output ports; a definition of two or more input ports, the input ports receive object streams of identical length; one or more instructions for processing input data received in the input ports and for outputting processed data in the output port groups, wherein the instructions are operative to output a same number of output objects to each output port in a same output port group, whereby the output ports of the output port group are operative to output objects stream of identical length, and wherein the instructions are operative to receive a same number of input objects from each input port, whereby the input ports are operative to receive object streams of identical length; and an indication of whether there is a constant ratio between a number of items in input streams received by the first block and a number of items in output streams outputted by the first block; and wherein said description of a first block is stored on said non-transitory computer readable medium.

14 Claims, 4 Drawing Sheets

(56) References Cited

U.S. PATENT DOCUMENTS

2008/0133891 A1 6/2008 Salz et al.
2009/0207859 A1* 8/2009 Beshai et al. ................. 370/474
2010/0205611 A1 8/2010 Wagner et al.
2010/0318768 A1 12/2010 Bouillet et al.

OTHER PUBLICATIONS

Jeong-Hyon Hwang et al., "High-Availability Algorithms for Distributed Stream Processing", ICDE '05 Proceedings of the 21st International Conference on Data Engineering. ISBN: 0-7695-2285-8. Publisher: IEEE.

Mitch Cherniack, et al, "Scalable Distributed Stream Processing", CIDR, 2003.

Daniel J. Abadi, et al, "Design Issues for Second Generation Stream Processing Engines", CIDR, 2005.

William Thies et al., "StreamIt: A Compiler for Streaming Applications", MIT Laboratory for Computer Science Technical Memo LCS-TM-622, Feb. 2002.

* cited by examiner

METHOD AND APPARATUS FOR WORKFLOW VALIDATION AND EXECUTION

TECHNICAL FIELD

The present disclosure relates to workflows in general, and to defining, validating and executing a workflow, in particular.

BACKGROUND

Computerized devices and computer programs control almost every aspect of our life, from writing documents to controlling traffic lights through commerce, communication, industry and almost any other area. An important area of computer programming relates to large-scale computationally heavy programs used for scientific processing and research, which process a lot of input data, perform numerous calculations and output results. Such programs may be related, for example, to various types of number crunching, climate changes analysis and weather forecasting, genomic research, machine learning, and other areas.

Designing and programming such programs present developers with many challenges, some of which are related to the large volumes of processed data and the processing complexity. Such programs usually require the collaborative work of multiple programmers or programmer groups, over long periods of time.

In some environments, such programs are developed in parts, wherein each programmer or group is responsible for a part of the processing, sometime referred to as a block. The blocks then have to be combined to provide solutions to the required tasks.

Current technologies do not provide a satisfactory solution to combining such blocks. The combination requires feasible transference of work products from one block to the other, so that a data-producing block generates the data in the same format as required by a block which receives the information. In addition, one or more blocks may require to process their input again, but may not be able to store all that input, or such storing may be too expensive in performance or resources terms. Current technologies do not provide adequate solution to such limitation as well.

Additional requirements beyond designing the basic correspondence between consecutive block, relate to rate balancing between the blocks. Such requirements may relate, for example, to eliminating overflow between blocks when an information-producing block generates information in a rate higher than the information-consuming block can process, balancing the accumulation of different inputs required for each block, or the like.

BRIEF SUMMARY

One exemplary embodiment of the disclosed subject matter is a computer program product comprising: a non-transitory computer readable medium; and a description of a first block comprising: a definition of one or more output port groups each comprising one or more output ports; a definition of two or more input ports, the input ports receive object streams of identical length; one or more instructions for processing input data received in the input ports and for outputting processed data in the output port groups, wherein the instructions are operative to output a same number of output objects to each output port in a same output port group, whereby the output ports of the output port group are operative to output objects stream of identical length, and wherein the instructions are operative to receive a same number of input objects from each input port, whereby the input ports are operative to receive object streams of identical length; and an indication of whether there is a constant ratio between a number of items in input streams received by the first block and a number of items in output streams outputted by the first block; and wherein said description of a first block is stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
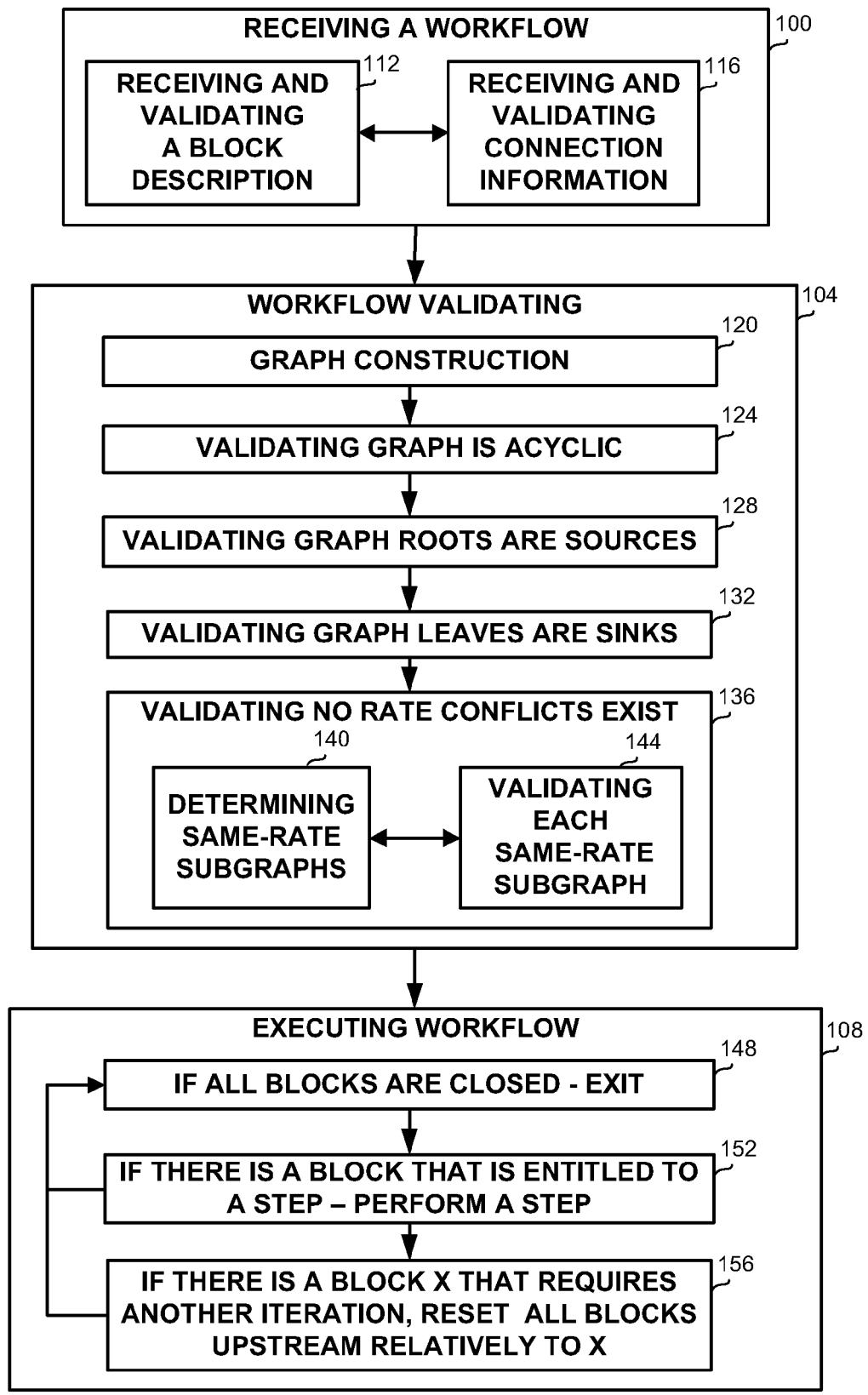
FIG. 1 shows a flowchart diagram of steps in a method for workflow validation and execution, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the construction of a workflow for processing large amounts for data, the workflow being constructed from a multiplicity of blocks, wherein a first block, also referred to as upstream block, optionally processes its input and passes one or more object streams to another block, also referred to as a downstream block for further processing. The term object stream relates to a finite sequence of objects of a particular type received or transmitted by a block, wherein the object types are detailed below. The objects are received by a block or output by a block in an orderly manner, i.e., one object is sent or received at a time, and objects of the same stream are received by a block at the same order in which they were output by another block.

Some blocks may be both upstream and downstream, such as an intermediate block receiving an object stream from one block, processing the object stream, and passing the processed object stream or a newly created object stream downstream to another block. A block receives its input through one or more input ports and outputs data through one or more output ports. In order to operate properly, the blocks and their combination have to comply with a number of limitations.

In some exemplary embodiments, It is required that consecutive blocks, i.e., combinations of two blocks wherein one block provides data directly to the other, have to match so that one or more types of information output by the first block can be received by the other block.

In some exemplary embodiments, the workflow has to comply with a limitation that no deadlocks may be created. Deadlock are situations in which a first block cannot process before one or more other blocks advance in processing, and vice versa, so that each block of a group comprising two or more blocks is waiting for another block of the group to continue processing, so that all blocks in the group are waiting and none can progress.

In some exemplary embodiments, a limitation on the workflow may be that there are no rate conflicts within the workflow, i.e., all data streams input into a block are of the same length. This limitation may be useful in order to avoid situations in which a block receives data streams of non-matching lengths. For example, a block handling personal data may receive one stream of ID numbers and another stream of names that should correspond to the ID numbers. It is required to avoid situations in which the block receives an incompatible number of ID numbers and names.

Another technical problem dealt with by the disclosed subject matter is the proper execution of a workflow. In case that the workflow complies with the requirements listed above it is guaranteed that the execution will be valid with respect to overflows and deadlocks. It is required that if a block has received input via its input ports it will be able to process it, and that if a block requires another iteration of its input, it will indeed receive the input again. Proper execution of the workflow may also require that overflow between blocks is avoided. Overflow refers to a situation in which one block outputs data at a certain pace, wherein the block consuming the data consumes it at a slower pace, thus producing data overflow.

Yet another technical problem is that each block after having processed its input may determine that it has to re-perform again on the same input. The goal is not to repeat the exact processing, but rather to re-iterate the calculations using a different initial state, e.g., an internal state of the block, implemented for example as one or more variables. The internal state having a different value on the second or consequent iteration than on previous ones, may cause different results to be obtained when processing the same data. In such a manner, processing algorithms which require several passes over the data may not require internally storing all the data, which may be a memory consuming task, but rather may ask to receive the same input again.

Thus multiple executions of the block may need to be enabled by the workflow. For example, in a block performing clustering, the number of required iterations is not a-priory known and demands for additional iterations may come up on the fly.

One technical solution is to construct a workflow from blocks, wherein each block is required to adhere with particular limitations, and the combination between blocks has to adhere with additional limitations.

The blocks are constructed so that each block has input ports for receiving data for processing from other blocks, and output ports for providing data to other blocks.

Each port may be associated with a data type, such as a scalar, a vector, a matrix, an integer, a float, a character, a string or any other simple or complex data structure. The block receives via each input port a stream of objects of the type associated with the input port, and outputs via each output port a stream of objects of the type associated with the output port.

In some exemplary embodiments, a block receives the same number of objects at each input port, and can perform an atomic operation called a block-step once it has a full set of inputs, i.e., one object at each input port.

This requirement can be illustrated as table-related: each input port may be associated with a column of a table, and each row in the table is associated with one input object being delivered at each of the input ports. The block can take a step, i.e., operate on its input data, only once it receives a full row, i.e., an input object at each input port.

The workflow topology, i.e., the way blocks are interconnected to one another so that one block can consume the output generated by another block, also has to adhere with certain criteria to ensure that the workflow limitations detailed above are met.

Once it is validated that the workflow is constructed properly, it can be executed, wherein execution is managed to meet the execution limitations listed above, i.e., ensure io that all blocks process their data; that each block can require to receive its input again for re-processing, and if such requirement was made that it is met; and that no overflow occurs between blocks, in which the data producing block provides information at a rate higher than the data consuming block can process. This is achieved by ensuring that each output queue of each block contains at most the output of one block-step at a time, so that a block producing information will never out-run the block consuming the information.

One technical effect of utilizing the disclosed subject matter is providing a systematic method and apparatus for validating or executing workflow for computationally heavy systems which process large amounts of data using separate instruction blocks.

In some exemplary embodiments, a workflow constructed in accordance with the disclosed subject matter can operate properly so that all its blocks fully perform their processing, and no deadlocks occur. Constructing the workflow in accordance with the disclosure thus ensures that work can be divided among multiple teams and yet be coordinated and provide results.

Another technical effect of the disclosed subject relates to execution of the workflow such that no overflow occurs and a block producing information will never out-run the block consuming the information. The workflow validation and execution also provide for enabling any block to request an additional iteration on its data, and to satisfy this request without performing unnecessary steps by other blocks.

Such workflow may be used in any large-scale system, such as systems handling genomic data. Requesting an additional iteration can be required, when the cost of retrieving the information is lower than the cost of storing the information by the block for further processing. In a non-limiting example, an additional iteration may be required by a block performing clustering which is of iterative nature. Since after each iteration the block will be at a different internal state, the clustering results will be different, and requesting an additional iteration may improve the results.

Another technical effect of utilizing the disclosed subject matter is the option to test the design of a workflow before fully implementing it. Validating the workflow by constructing pseudo-blocks by indicating only the block type and the inputs and outputs of each block, ensures that the workflow as a whole is functional, will finish its processing and will not get into deadlocks or overflows.

Implementing the blocks only after the workflow is validated may prevent the investment of significant resources in implementation followed by finding out that the resulting workflow is non-functional and has to be redesigned and re-implemented.

Referring now to FIG. 1, showing a flowchart of steps in a method for workflow validation and execution.

On 100, the workflow is received, and on 104 the workflow is validated. Once validated, on 108 the workflow is optionally executed.

Receiving the workflow steps 100 optionally comprise a block description receiving and validation step 112 for receiving descriptions of at least two blocks, and connection receiving and validation step 116, for receiving and validating the topology of the workflow, i.e., that at least one block is a source i.e. does not receive input from any other block, which blocks consume the output of other blocks, and that at least one blocks is a sink, i.e. does not output information to be consumed by other blocks. It will be appreciated that parts of steps 112 and 116 can be performed in any required order, such as first receiving all blocks and all connections, followed by verifying the blocks and connections; receiving one block and verifying it at a time, and receiving one connection and verifying it at a time, or the like.

Figure 2A:
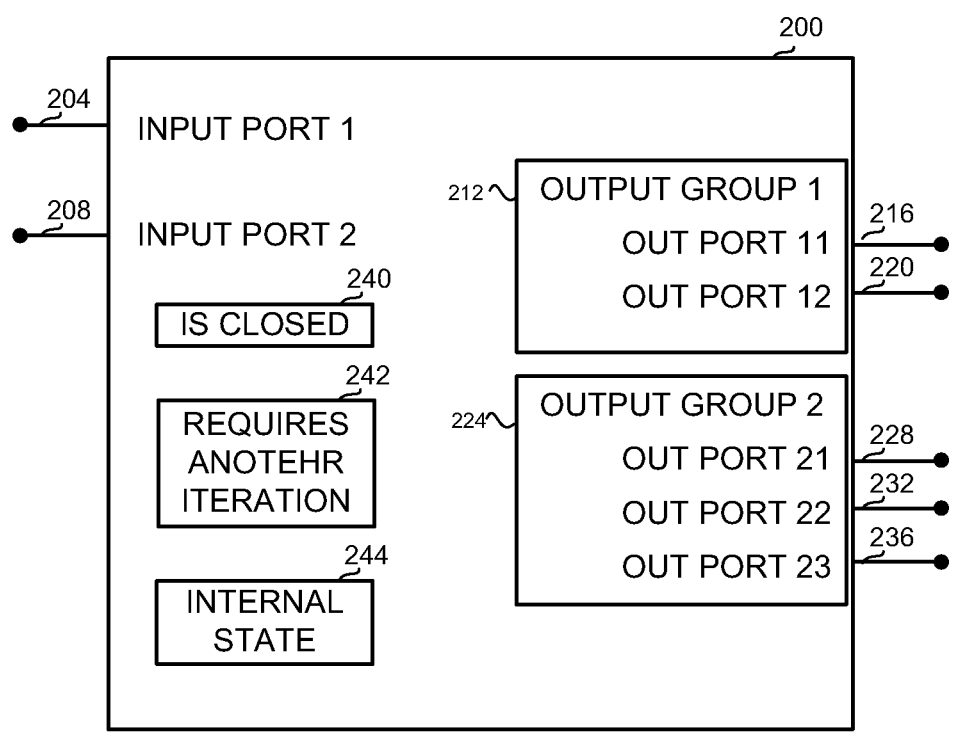
FIG. 2A shows a simplified illustration of a workflow block, in accordance with some exemplary embodiments of the disclosed subject matter.

Referring now to FIG. 2A, showing a schematic illustration of a block 200. Block 200 comprises two input ports, input port 1 (204) and input port 2 (208). Block 200 further comprises two output port groups, being output group 1 (212) and output group 2 (224). Output group 1 (212) comprises output port 11 (216) and output port 12 (220), while output group 2 (224) comprises output port 21 (228) and output port 22 (232) and output port 23 (236).

In some exemplary embodiments, each port is associated with a data type, such as a scalar, a vector, a matrix, an integer, a float, a character, a string or any simple or complex data structure. A block receives via each input port a stream of objects of the type associated with the input port, and outputs via each output port a stream of objects of the type associated with the output port.

In some exemplary embodiments, it is validated on receiving and validating block description step 112 that a block receives the same number of objects through each of its input ports, i.e., all object streams received via the input ports of one block are of the same length, although each may be of its own type. A block can operate only if it has an input object in each of its input ports.

The output ports of a block are divided into groups, and it is optionally validated on step 112 that the block outputs the same number of objects through all ports associated with the same group. Thus, block 200 can output two object streams having the same length through output port 11 (216) and output port 12 (220), and three object streams having the same length (which may differ from the length of object streams output by output port 11 and output port 12).

Thus, the output ports of each output port group may also be described as a table, in which each output port in the group is associated with a column, and each row is associated with outputting an object through each output port of the particular group.

The block may also comprise an IsClosed flag 240, a RequiresAnotherIteration flag 242, wherein each flag can be implemented as a field, variable, or any other memory area. Both flags are initially set to FALSE. The usage of both flags is detailed below. The block may optionally comprise one or more internal state indicators 244 indicating an internal state of the block, which may be useful when requesting and performing an additional iteration of the data.

Each block operates in block-steps. In each block-step the block optionally receives one object input on each input port, i.e., a full set of input data, performs calculations on the data, and optionally changes its internal state. The block can then output zero or more objects via one or more of its output port groups, i.e., zero or more rows of data on each output group.

If a block has no more data to output, it may output a delimiter such as an end-of-file delimiter (EOF) to indicate to the next block that no more data is to be expected. At such situation, the block may change its IsClosed flag 240 to TRUE.

Some block types may be specifically defined since they may be handled in a particular manner.

Sources are blocks that do not have input ports, and thus do not receive information from other blocks. A source block may, for example, prompt a user to enter data, retrieve data from a database, receive data from any source external to the workflow, or operate without input data.

Sinks are blocks that have no output ports and thus do not output data to be consumed by other blocks. Sinks may output data to a user, store data in a database, write data to one or more files, or the like.

One-to-one blocks are blocks that transmit a single object at each output port on each block-step, i.e., the ratio between the number of records input into the block and output by the block is one to one. One-to-one blocks thus output object streams having the same number of elements as their input object streams. When a one-to-one block receives an EOF on its input ports, it outputs an EOF on its output ports.

All other block types are referred to as "any" and do not require specific handling.

In some exemplary embodiments, each block comprises an indication of its type. If the block is neither a source nor a sink, the type may consist of or may further comprise an indication to the ratio between the number of records input into the block and the number of records output by the block, if there is such constant ratio. The block may provide interface to report its type or the ratio, or may enable access to one or more variables storing the information.

Referring now back to FIG. 1. On connection receiving and validation step 116 it is validated that if a first block is connected to a second block wherein the second block receives information produced by the first block, then the information types associated with at least some output ports of the first block are compatible with the information types required by some input ports of the second block.

Workflow validating steps 104 optionally comprise graph construction step 120 in which a directed graph representation is constructed upon the description of the blocks and their interconnections. A node is created in the graph for each block in the workflow, and a directed edge going from node 1 to node 2 is created if an output port of a block associated with node 1 outputs data that is consumed by an input port of a block associated with node 2.

It will be appreciated by a person skilled in the art that constructing the graph representation and the steps below that manipulate the graph, are merely used as one exemplary implementation of manipulating the workflow, and that other implementations may be devised as well. In the explanations below the terms nodes and blocks, and the terms edges and connections may be used interchangeably.

On step 124 may be validated that the graph constructed on step 120 is a-cyclic, i.e., contains no cycles, or in other words that the workflow is a collection of one or more trees. The existence of circles in the graph may indicate a deadlock in the workflow, i.e., a situation in which a first block waits for data to be produced by a second block, wherein the second block waits for input from block 1. Therefore the existence of cycles is not allowed in the graph.

On step 128 it may be validated that all graph roots are sources, i.e., their associated blocks do not receive input data from any other block in the workflow, and that all source blocks are roots of the graph.

On step 132 it may be validated that all graph leaves are sinks, i.e., their associated blocks do not output data to be consumed by any other block in the workflow, and that all sink blocks are leaves of the graph.

On step 136 it may be validated that no rate conflict exists within the graph. The absence of rate conflicts is validated by step 140 for determining same-rate subgraphs, followed by step 144 for validating each subgraph determined on step 140.

Figure 2B:
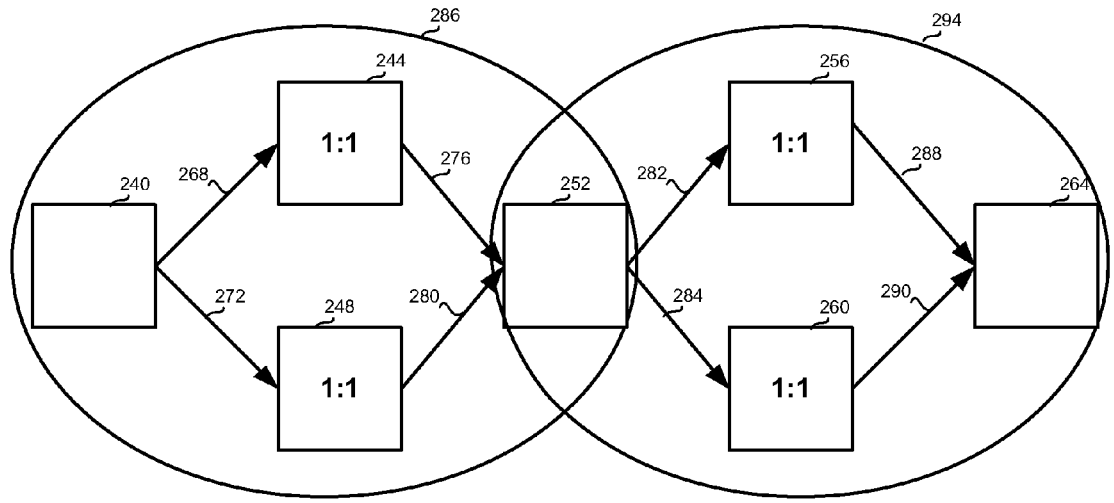
FIG. 2B shows a simplified illustration of a graph constructed based on a valid workflow, in accordance with some exemplary embodiments of the disclosed subject matter.

In some exemplary embodiments, step 140 for determining same-rate subgraphs may be performed as follows, and as demonstrated by FIG. 2B. FIG. 2B shows an exemplary graph representing a workflow, wherein the meaning of a node indicated as 1:1 is that the node is associated with a one-to-one block.

For determining the subgraphs, a relation may be defined over the edges, which may be named for example a "same rate" relation. In some exemplary embodiments, this relation is extended to be an equivalence relation, wherein: 1. each edge is in the same rate relation with itself; 2. two edges are defined to be in the same-rate relation if and only if any of the conditions below holds; and 3. transitive closure is applied to the relation thus optionally adding additional pairs of edges to the relation.

In some exemplary embodiments, the conditions for including two edges in the same rate relation are:

1. The two edges are connected to output ports in the same group of the same block. This condition makes edges 268 and 272 in a same-rate group, and edges 282 and 284 in another same-rate group.

2. The two edges are connected to input ports of the same block. This condition makes edges 276 and 280 in a same-rate group, and edges 288 and 290 in a same-rate group.

3. One of the edges is incoming into a node associated with a one-to-one block and the other is going out of the same block. This makes edges 268 and 276 in a same-rate group, edges 272 and 280 in a same-rate group, edges 282 and 288 in a same-rate group, and edges 284 and 290 in a same-rate group.

Once all edges are mapped, equivalence classes of the equivalence relation derived from the same-rate relation are formed from all the graph edges, thus grouping edges of the same rate of data flow. In the case shown in FIG. 2B, two equivalence classes are formed, one including edges 268, 272, 276 and 280, and the other including edges 282, 284, 286 and 288.

Once the equivalence classes are determined, the edges of each equivalence class, together with their adjacent nodes determine a subgraph of the graph representing the workflow. In the case shown in FIG. 2B, the two formed subgraphs are encircled by ovals 286 and 294.

Each such subgraph is acyclic since it is partial to the initial graph, and therefore cannot contain cycles as well.

In some exemplary embodiments, step 144 for validating each subgraph may be performed by validating the following conditions:

1. Each subgraph has a single root node. This condition holds for the subgraphs surrounded by ovals 286 and 294, since nodes 240 and 252, are respectively, the roots of the subgraphs. By definition, these roots cannot be one-to-one nodes, otherwise the edges incoming into them would have been in the subgraph as well, which would eliminate them from being roots. This condition guarantees that all object streams being input into the subgraph have the same length, i.e., the same number of objects.

2. Each subgraph has one or more leaf nodes. This condition holds for the subgraphs surrounded by ovals 286 and 294, since nodes 252 and 264, respectively, are the leaves of the subgraphs. By definition, these roots also cannot be one-to-one nodes, otherwise the edges leaving them would have been in the subgraph as well, which would eliminate them from being leaves.

3. All other nodes in the subgraph are one-to-one. This condition holds for the subgraphs surrounded by ovals 286 and 294, since nodes 244, 248, 256 and 260 are all one-to-one nodes.

Figure 2C:
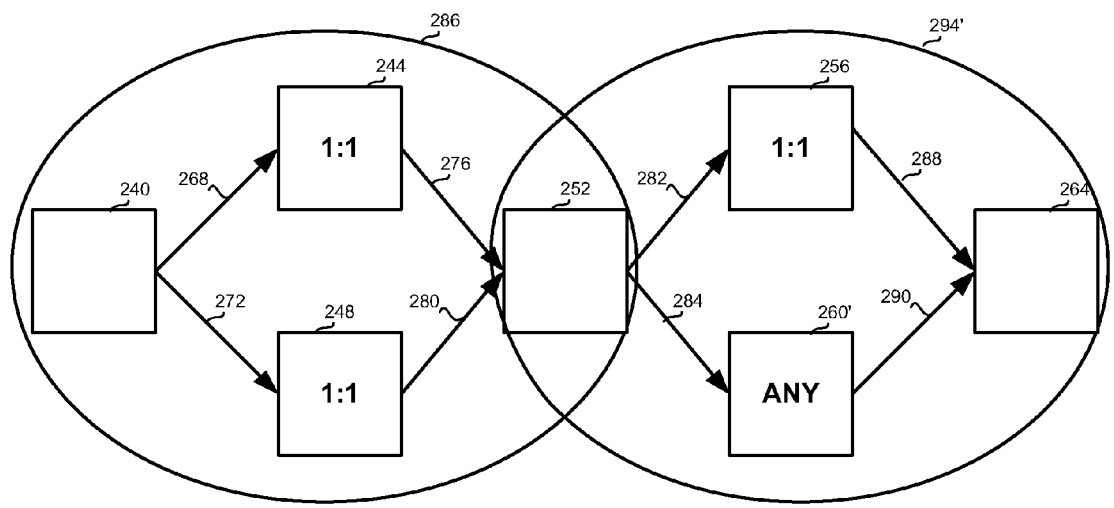
FIG. 2C shows a simplified illustration of a graph constructed based on an invalid workflow, in accordance with some exemplary embodiments of the disclosed subject matter.

Referring now to FIG. 2C, showing an identical workflow to the one of FIG. 2B, except that block 260' is not one-to-one but of any arbitrary ratio. Edges 282 and 288 are in a same-rate group since edge 282 is incoming into a node associated with a one-to-one block and the other is going out of the same block; edges 282 and 284 are in a same-rate group since they are connected to output ports in the same group of the same block, and edges 288 and 290 are in a same-rate group since they are connected to input ports of the same block. Thus oval 294' will be created, but will not comply with condition (3) above since it comprises block 260' which is a non one-to-one block. This complies with the intuition, since edge 290 can input into block 264 an object stream having a different length than the object stream input through edge 288, thus making block 264 inoperative.

If all subgraphs of the graph comply with the condition, the graph is valid.

Once the graph is validated it can be executed. Executing the graph relates to execution of block-steps by blocks, in a predefined manner, and in accordance with a set of rules. During execution, each edge is associated with a queue of objects passed from the block associated with the beginning node of the edge, to the block associated with the end node of the edge.

In some exemplary embodiments, the following set of rules and definitions may be applied:

1. A block is entitled to a step as long as its IsClosed variable is FALSE, i.e., it has not finished processing its input yet.

2. A non-source block is entitled to a step if it has an object in each of its input ports. As detailed above, having one object on each input port can be described as a row in a table, which is required by the block for its operation. Once the block received the objects via its input ports, the objects are removed from the respective queues. Once the block received all its input, as may be indicated by EOFs on its input ports, it may either: a. output an EOF on its output ports and set its IsClosed flag 240 to TRUE; or b. set its RequiresAnotherIteration variable to TRUE.

3. A non-sink block is entitled to a step if all queues associated with its output ports are empty, i.e., all the data it has already output has been consumed by downstream blocks. At each such step, the block can output zero or more objects via each output port, wherein a one-to-one block can output exactly one object on each output port on each step.

4. A block which is non-source and non-sink is entitled to a step in accordance with both (2) and (3) above.

5. A source block is entitled for a step as long as its IsClosed flag 240 is FALSE, and in accordance with condition (3) above. A source block outputs at each step one or more object at each of its output ports. A source block cannot set its RequiresAnotherIteration to TRUE, since requiring an additional iteration means the block needs to reread its input streams from the beginning. A source block has no input streams, and therefore the RequiresAnotherIteration is irrelevant for such a block. Once a source block has issued EOFs on its output ports, it sets its IsClosed flag 240 to TRUE.

6. A block whose IsClosed flag 240 is TRUE can be reset, which causes its internal state to reset to the default value or values, and the IsClosed flag to be set to FALSE.

In some exemplary embodiments, executing the workflow comprises a loop through steps 148, 152 and 156 until IsClosed flag 240 of all blocks is set to TRUE.

On step 148 it may be determined whether all blocks are closed, i.e., the IsClosed flag 240 of each one of the blocks in the workflow is set to TRUE, in which case execution is finished.

Otherwise, it is determined on step 152 whether there is at least one block that is entitled to a step. If there is such block, the block executes the step. After execution of the block step, control goes back to step 148.

If no block exists which is entitled to a step, there is at least one block that requires an additional iteration, otherwise IsClosed flag 240 of all blocks would have been set to TRUE. It will be appreciated by a person skilled in the art that in order to satisfy the additional iteration requirement, all blocks upstream to the block that requires the additional iteration should be reactivated in order to restart the supply chain.

On step 156, all blocks that require an additional iteration are identified, and referred to as collection X. Then each block that is not part of X, but is an ancestor of any of the blocks in X, is also identified, thus creating a second collection, named for example Y. Each block in the Y collection is producing information that is directly or indirectly consumed by one or more of the blocks in X. In other words, Y comprises all blocks that are upstream relatively to X.

It will be appreciated by a person skilled in the art that Y is a non-empty collection. As detailed above, source nodes cannot set their "RequiresAnotherIteration" flag to TRUE, and therefore none of the source nodes is in X. Therefore X contains only non-source nodes, which must therefore have ancestors.

In some exemplary embodiments, all Y blocks are then reset, setting their respective IsClosed flag 240 to FALSE, and resetting their internal state. It is possible to reset the Y blocks without interrupting any block during operation, since it will be appreciated by a person skilled in the art that all blocks in Y have their "IsClosed" flag set to TRUE. All Y blocks having their "IsClosed" flag set to TRUE results from the constraints the workflow must adhere to, and from the way the workflow is executed.

Resetting the Y blocks will cause execution to resume for at least one source block and at least one of its downstream blocks. When any of the X blocks becomes entitled to a step, it may perform that step with its internal state preferably different than it was when it performed its steps on the first iteration, otherwise the results would be repeated as well.

The execution method of steps 108 ensures that execution stops only after all blocks fully operate on all provided data, and also re-iterate if required.

Figure 3:
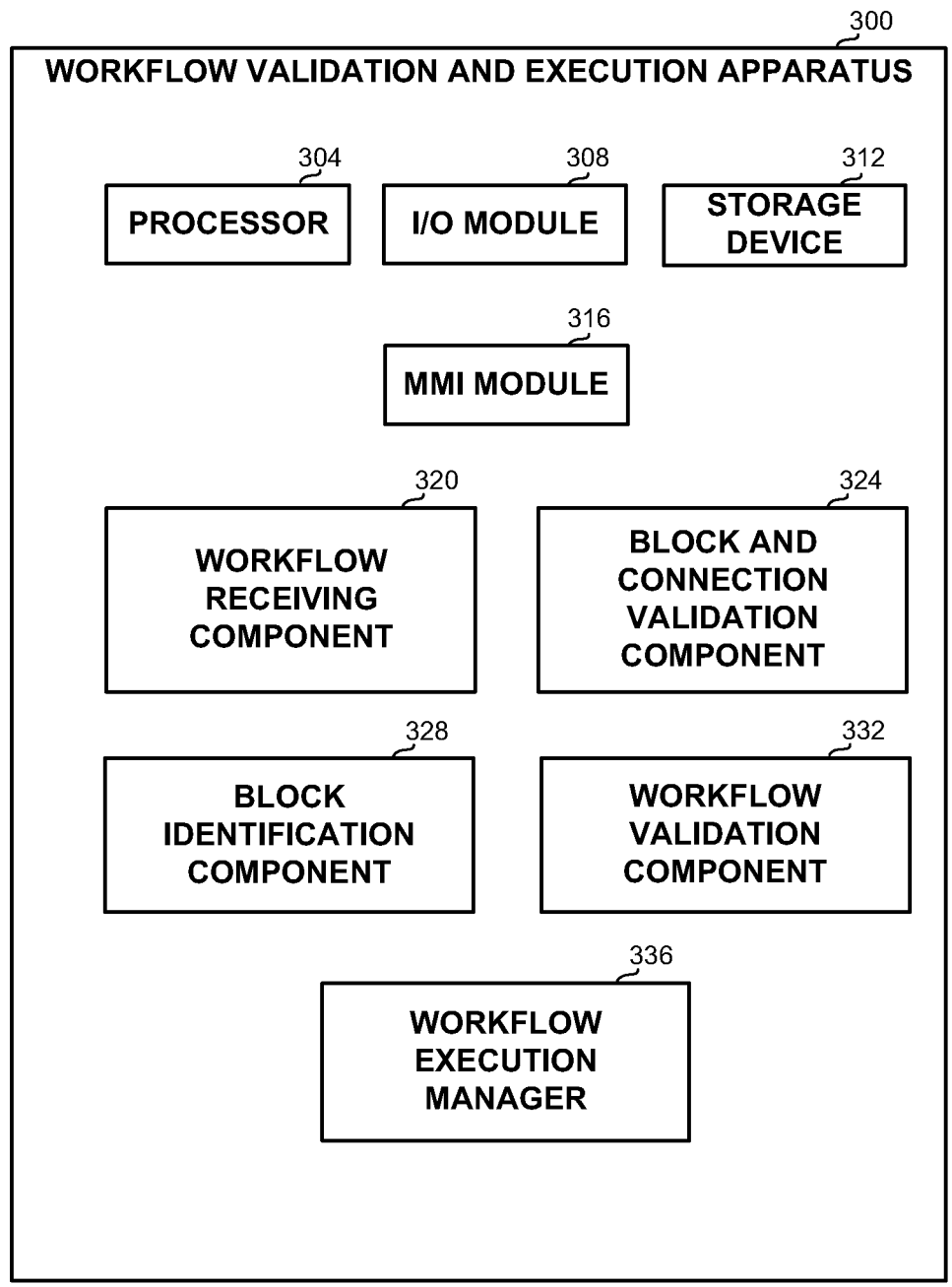
FIG. 3 shows a block diagram of components of an apparatus for workflow validation and execution, in accordance with some exemplary embodiments of the disclosed subject matter.

Referring now to FIG. 3 showing a computerized apparatus 300 in accordance with some exemplary embodiments of the disclosed subject matter, the apparatus operative for validating and executing a workflow.

In some exemplary embodiments, apparatus 300 may comprise a processor 304. Processor 304 may be a Central Processing Unit (CPU), a microprocessor, an electronic circuit, an Integrated Circuit (IC) or the like. Alternatively, apparatus 300 can be implemented as firmware ported for a specific processor such as digital signal processor (DSP) or microcontrollers, or can be implemented as hardware or configurable hardware such as field programmable gate array (FPGA) or application specific integrated circuit (ASIC). Processor 304 may be utilized to perform computations required by apparatus is 300 or any of it subcomponents.

In some exemplary embodiments of the disclosed subject matter, apparatus 300 may comprise an Input/Output (I/O) module 308. I/O module 308 may be utilized to receive input or provide output to and from the apparatus, for example receiving specific user commands or parameters related to the apparatus, storing and retrieving information to and from a database, providing output for viewing performance data, problem indications, bottlenecks, or the like.

In some exemplary embodiments, apparatus 300 may comprise one or more storage devices such as storage device 312. Storage device 312 may be persistent or volatile. For example, storage device 312 can be a Flash disk, a Random Access 25 Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause processor 304 to perform acts associated with any of the steps of method 100, for example storing the workflow, storing the data the workflow operates on, or its results, or the like.

A user (not shown) may utilize a man-machine interface (MMI) device 316 such as a terminal, a display, a keyboard, an input device or the like to interact with the system, to invoke the system and to receive results. It will however be appreciated that the system can operate without human operation.

The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Apparatus 300 may comprise a workflow receiving component 320, for receiving a workflow, i.e., receiving one or more block descriptions, and interconnections between the blocks.

Apparatus 300 may further comprise block and connection validation component 324 for validating the blocks and connections received by workflow receiving component 320, and determining whether each block and each connection complies with the requirements, as detailed in association with steps 100 of FIG. 1.

Apparatus 300 may further comprise block identification component 328 for identifying the type of a given block: whether it is a source, i.e., a block that does not receive input from any other block in the workflow; a sink, i.e., a block that does not output data to any other block in the workflow; or a one-to-one block, i.e., a block that after receiving an object through each input port, and processing the received objects, outputs one object on each output port. Any block that does not comply with any of the detailed types is an "any" block with no specific conditions.

Yet another optional component of apparatus 300 is workflow validation component 332 for validating that the workflow as a whole complies with the requirements as detailed in association with steps 100 of FIG. 1 above.

Workflow validation component 332 may optionally comprise a graph constructing component (not shown) for constructing a graph representation based on the received blocks and their connections, as detailed in association with step 120 of FIG. 1 above. The workflow may then be validated using the graph representation. Validation may include the following requirements: that the graph is acyclic; that all the graph root nodes are associated with source blocks; that all the graph leaf nodes are associated with sink blocks; and that no rate conflicts exist within the graph, as detailed in association with step 136 of FIG. 1 above.

The graph may be executed by workflow execution manager 336, which is a framework that handles the execution of block-steps for the blocks. Workflow execution manager 336 may comprise components for monitoring the IsClosed and RequiresAnotherIteration flags of the blocks, monitoring the queues associated with the graph edges, and managing the flow as detailed in association with steps 108 of FIG. 1. Managing the workflow may include the following loop: if the IsClosed flag of each of the blocks is set to TRUE, the program exits; otherwise if there is at least one block that is entitled to perform a step, the block performs the step and execution goes back to testing whether the IsClosed flag of each of the blocks is set to TRUE, in which case the program exits; otherwise all ancestors of all blocks that require additional indication are reset, and execution goes back to testing whether the IsClosed flag of all blocks is set to TRUE, in which case the program exits.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, IO operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer program product comprising,
   a non-transitory computer readable medium; and
   a description of a first block comprising:
   a definition of at least one output port group comprising one or more output ports;
   a definition of at least two input ports, the at least two input ports receive object streams of identical length;
   at least one instruction for processing input data received in the at least two input ports and for outputting processed data in the at least one output port group,
   wherein the at least one instruction is operative to output a same number of output objects to each output port in a same output port group, whereby the output ports of the output port group are operative to output objects stream of identical length, and
   wherein the at least one instruction is operative to receive a same number of input objects from each input port, whereby the at least two input ports are operative to receive object streams of identical length; and
   an indication of whether there is a constant ratio between a number of items in input streams received by the first block and a number of items in output streams outputted by the first block; and
   wherein said description of a first block is stored on said non-transitory computer readable medium;
   wherein the non-transitory computer readable medium stores:
   a workflow comprising at least the first block and a second block, the second block complying with the block description; and
   an instruction for validating that the workflow can operate properly, using the constant ratio,
   wherein during execution, each of the first block and the second block can keep an internal state and request to receive again data previously received as input.

2. The computer program product of claim 1 wherein:
   execution of the workflow comprises processing data by at least one of the first block or the second block,
   execution is performed until all blocks in the workflow finished processing, and
   if the first block or the second block requests to receive again data previously received as input, the first block or the second block receive the data and re-perform the at least one instruction over the data with the internal state as kept.

3. The computer program product of claim 2 wherein no data overflow occurs between the first block and the second block during execution.

4. The computer program product of claim 2, wherein executing the workflow comprises repeating the following steps until all blocks are closed:
   if there is a block that is entitled for a step, the block perform a step; and
   otherwise perform:
   determine at least one block that requires another iteration;
   determine all upstream blocks of the at least one block; and
   reset all upstream blocks.

5. The computer program product of claim 4, wherein a non-source block is closed when it has finished processing its input stream, received a delimiter and did not request to receive its input again.

6. The computer program product of claim 4, wherein a non-source block is entitled to a step if there is at least one object in each of its input ports, and wherein a non-sink block is entitled to a step if there are no objects at queues associated with any of its output ports.

7. The computer program product of claim 1, wherein none of the first block or the second block is required to store its inputs in memory.

8. The computer program product of claim 1, wherein validating that the workflow can operate properly refers to: no deadlocks may occur between the first block and the second block, and no rate imbalance of information may occur between the first block and the second block.

9. The computer program product of claim 1, wherein:
   the first block comprises at least one output port group comprising at least two output ports, wherein the at least two output ports output object streams having identical length, and
   the second block comprises at least two input ports, the at least two input ports receive object streams of identical length.

10. The computer program product of claim 1 further comprising validating that:
    each of the first block and the second block receives object streams of identical length, and
    output ports of an output port group of each of the first block and the second block are operative to output objects stream of identical length.

11. The computer program product of claim 1, wherein validating the workflow comprises:
    constructing a graph, wherein the graph is a directed graph and each node in the graph is associated with one block, and an edge exists from a first node to a second node if an output port of a block associated with the first node outputs information received through an input port of a block associated with the second node;
    validating that the graph is acyclic;
    determining at least one subgraph of the graph; and
    validating the at least one subgraph.

12. The computer program product of claim 11, wherein validating the at least one subgraph comprises validating that:
   the at least one subgraph has a single root, and
   all nodes within the subgraph which are neither a root nor a leaf are associated with blocks that have a ratio of one between the number of input records and the number of output records.

13. The computer program product of claim 11, wherein determining the at least one subgraph comprises:
   grouping edges having same rate of data flow; and
   determining the at least one subgraph based on each group of edges and nodes adjacent to one edge of the group of edges.

14. The computer program product of claim 13, wherein edges are grouped based on existence of one condition selected from the group consisting of:
   the edges are associated with output ports of one output group of one block;
   the edges are input into one node; and
   one of the edges ends at a node and another of the edges starts at the node, wherein the node is associated with a block whose ratio between the number of input records and the number of output records is one to one.

* * * * *